United States Patent [19]

Yokota

[11] Patent Number: 4,819,011

[45] Date of Patent: Apr. 4, 1989

[54] THERMAL PRINTER TEMPERATURE REGULATION SYSTEM

[75] Inventor: Yuji Yokota, Iwate, Japan

[73] Assignee: Kabushiki Kaisha Sato, Japan

[21] Appl. No.: 915,700

[22] Filed: Oct. 6, 1986

[30] Foreign Application Priority Data

Oct. 8, 1985 [JP] Japan ................................ 60-222768

[51] Int. Cl.[4] ...................... G01D 15/10; G05D 23/00; F25B 21/02; B41J 3/20

[52] U.S. Cl. ................................ 346/76 PH; 219/216; 62/3; 165/104.11; 400/120

[58] Field of Search .................... 346/76 PH; 219/216, 219/530, 531, 540; 62/3; 165/104.1; 400/120

[56] References Cited

U.S. PATENT DOCUMENTS

∝,253,515 3/1981 Swiatosz .............................. 165/61

4,402,185 9/1983 Perchak .................................... 62/3

4,405,961 9/1983 Chow et al. .................... 360/129 X 4,502,056 2/1985 Matsuda ......................... 346/76 PH 4,620,421 11/1986 Brown et al. ............................. 62/3

4,639,883 1/1987 Michaelis ........................ 364/557 X 4,673,030 6/1987 Basiulis ............................. 165/32 X

*Primary Examiner*—E. A. Goldberg

*Assistant Examiner*—Gerold E. Preston

*Attorney, Agent, or Firm*—Ostrolenk, Faber, Gerb & Soffen

[57] ABSTRACT

A temperature regulator is provided in a thermal printer to maintain reliable and consistent printing quality. The temperature regulator is constructed to either remove heat generated during the printing process from the printing area and/or from the printer itself or to supply heat as needed to maintain a constant temperature. The temperature regulator is formed of a heat pipe and a thermoelectric transducer with a common controller.

25 Claims, 10 Drawing Sheets

THERMAL PRINTER TEMPERATURE REGULATION SYSTEM

BACKGROUND OF THE INVENTION

The present invention relates to a thermal printer, and more particularly to a thermal printer which is provided with a temperature regulator which is effective for assuring reliable and consistent printing characteristics.

In general, thermal printers use thermosensitive paper or thermal transfer carbon ribbon to produce printed impressions. FIG. 1 is an example of a thermal transfer printer which uses thermal transfer carbon ribbon. A roll of thermal transfer carbon ribbon 1 is mounted on a feed spindle 2. Thermal carbon transfer ribbon 1 is supplied from and conveyed by guide roller 3, thermal print head 4, platen 4 and pinch rollers 6 until it reaches take-up spindle 7.

During printing, thermal transfer carbon ribbon 1 and label strip 8 are held between thermal print head 4 and platen 5 at which point heating elements 10 of thermal print head 4 heat up and cause carbon ink to be transferred from the ribbon onto label strip 8 in accordance with a pattern determined by certain printing signals. Label strip 8 is transferred out from feed spindle 11 and passes via thermal print head 4, platen 5 and guide roller 12 to take-up spindle 13.

Both the thermal paper or thermal ribbon types of thermal printers require a heating section of some type. Also needed is a temperature control means or circuit (not shown) to regulate the temperature in a printing zone 14.

However, if the printer is used for extended periods of time or under extreme ambient temperature conditions, unacceptable printing quality may be observed. For example, if the printer is located in an abnormally high ambient temperature region, the thermosensitive paper or the thermal carbon ribbon becomes too hot. The print is then smudged and in extreme cases the entire surface of the printing paper may be blackened completely during the printing process. In abnormally cold environments, for example in a cold storage warehouse or the like, it may be difficult to attain a minimum requisite printing temperature. This produces a blurred print.

The above problems arise with either thermosensitive paper or with thermal transfer carbon ribbon.

SUMMARY OF THE INVENTION

It is an object of the present invention to provide a thermal printer which produces good quality printing both under overheated or overcooled ambient conditions.

To realize the foregoing and other objects the present invention comprises a thermal printer wherein a printing region or a printer housing is provided with thermal transfer means such as a heat pipe having a very high thermal transfer rate. Or, a thermoelectric transducer is deployed which enables heat to be carried away or to be supplied to the print region or to the printer generally simply by controlling the direction of current flow through the transducer.

DESCRIPTION OF THE PREFERRED EMBODIMENTS

Figure 1:
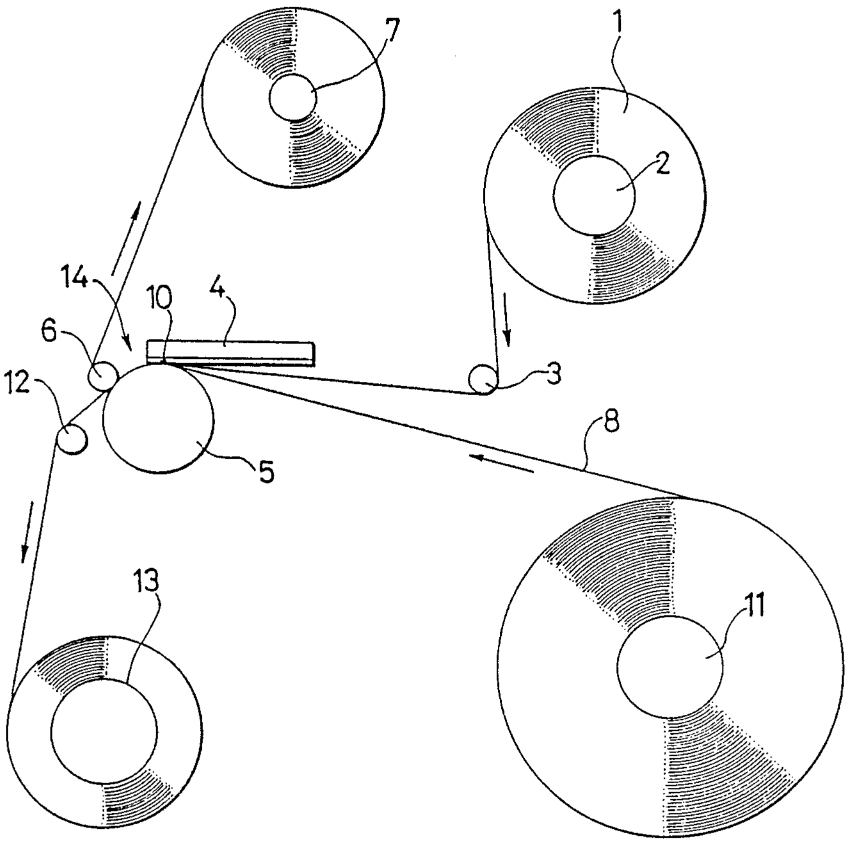
FIG. 1 is a simplified view of a thermal transfer printer.

Reference numerals in FIGS. 2–13 are consistent with the reference numerals used in FIG. 1. The description of the invention proceeds below, starting with FIG. 2 and continuing sequentially with the embodiments of the remaining figures. Although the descriptions refer to a thermal transfer type printer, the descriptions are applicable to a printer which uses thermosensitive paper as well.

Figure 2:
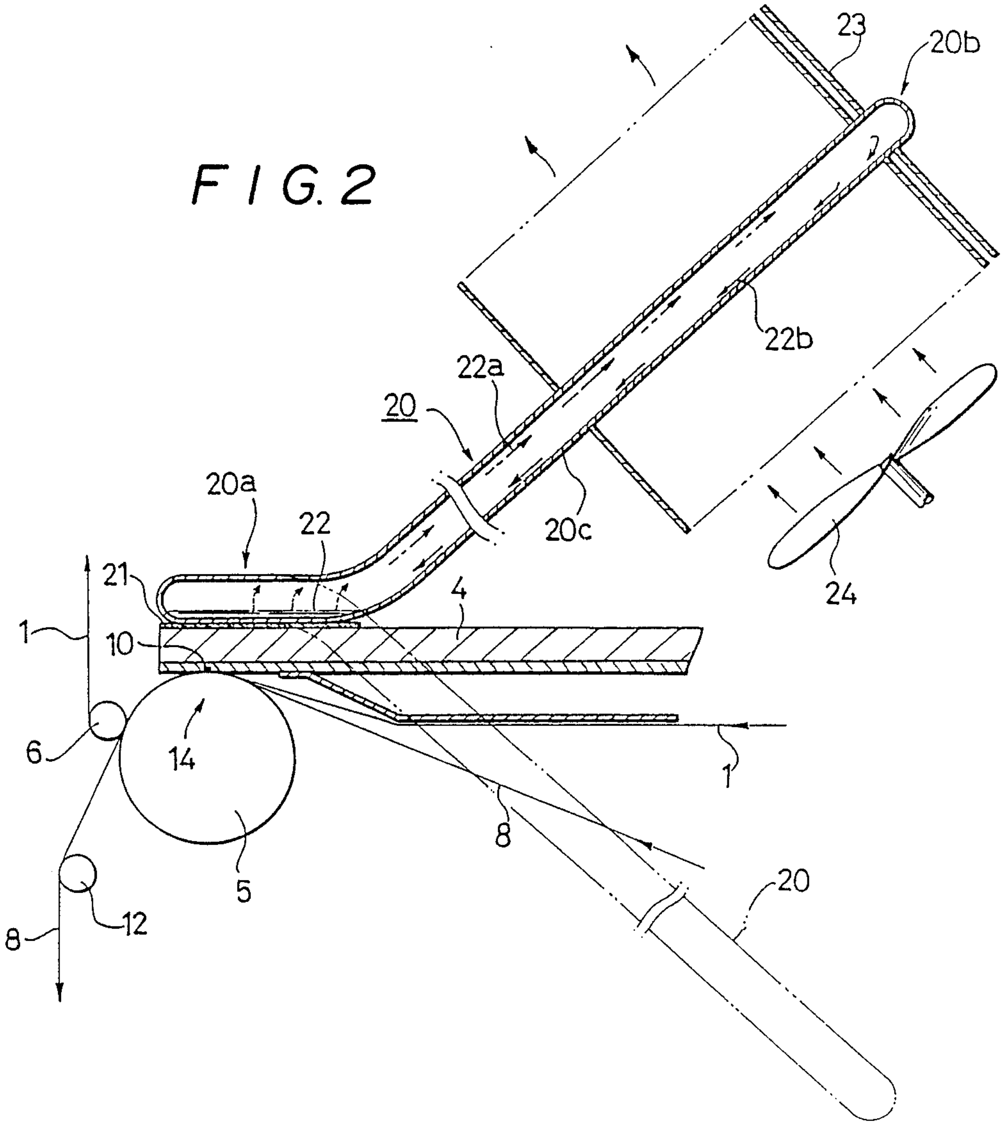
FIG. 2 illustrates the principal parts of a first embodiment a first feature of the present invention.

The first embodiment, which is illustrated in FIG. 2, employs a heat pipe 20 as a heat transferring means. In this application, heat pipe 20 is deployed to cool an area of thermal print heat 4. The heat absorbing portion **20*a* of heat pipe 20 is attached to the upper portion of thermal print head 4 by an adhesive 21 of good thermal conductivity. A heat discharge portion 20*b* of heat pipe 20 is located at a position above heat absorbing portion 20*a* and away from the area of thermal print head 4** which is to be cooled.

After air is removed from cylindrical member **20*c*, heat pipe 20 is charged with a predetermined amount of operating fluid 22 and thereafter sealed. Operating fluid 22, which may be freon, water or the like, absorbs heat from heat absorbing portion 20*a*, turns to steam 22*a* and flows to heat discharge portion 20*b*. The fluid circulates at a very high speed which approaches or exceeds the speed of sound. Upon reaching heat discharge portion 20*b*, steam 22*a* discharges heat as it changes to a liquid 22*b*. The liquid then circulates back to heat absorbing portion 20*a* of heat pipe 20. The interior of the heat pipe 20 is lined with grooves or wicks or the like (not shown) to produce a capillary action which facilitates circulation of liquid 22*b***.

A large number of fins 23 are provided on heat discharge portion **20*b* to increase its heat discharging surface. A fan 24** is further included for further enhancing the heat removal capacity of the present invention.

Consequently, heat generated at thermal print head 4 near and about printing zone 14 is transferred at a very high rate to a remote location. As a result, thermal print head 4 and platen 5 are cooled to a required temperature.

Heat pipe 20 can also be used as a heater if it is oriented as in the phantom line drawing of FIG. 2. In this mode, thermal print head 4 can be heated by heat pipe 20 which will absorb heat from a remote location and discharge that heat at print head 4.

Figure 3:
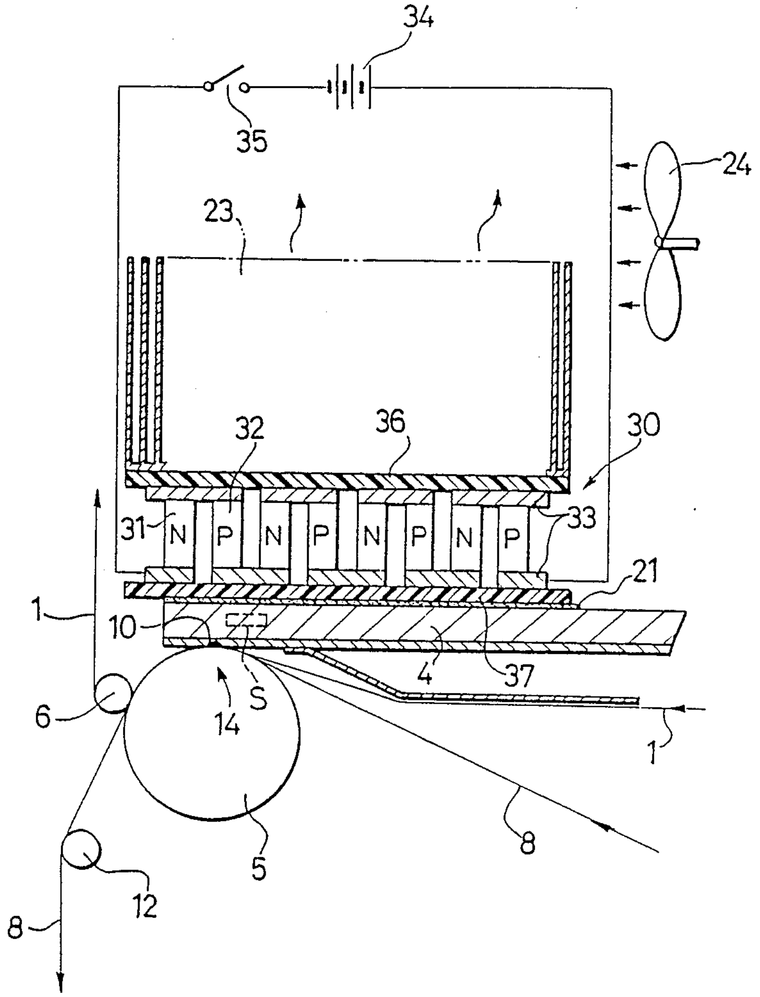
FIG. 3 illustrates the principal parts of a second the first feature of the present invention.

A thermoelectric transducer based embodiment for a heat transfer device is illustrated in FIG. 3 in the form of thermo-module 30. Thermo-module 30 comprises n-type semiconductors 31 and p-type semiconductors 32 connected in series by electrical connectors 33 and powered by power supply 34 through switch 35. The outer surfaces of electrical conductors 33 are insulated with electrical insulators 36 and 37.

As in the first embodiment, an adhesive 21 is used to bond thermo-module 30 via insulators 37 to thermal print head 4. Adhesive 21 has good thermal conductivity and the surface of electrical insulators 36 dissipates heat to fins 23.

Through the Peltier effect which is established between the n-type semiconductors 31 and p-type semiconductors 32, thermo-module 30 provides cooling at insulators 37 and heating at insulators 36 if the current direction through the module is as shown in FIG. 3. Therefore, heat generated at thermal print heat 4 is absorbed by insulators 37 of thermo-module 30. The absorbed heat appears at insulator 36 and is conducted to fins 24 which are subject to the cooling action of fan 24.

Simply by changing the current direction in thermo-module 30, the process is reversed and insulators 37 will supply heat to print head 4. Thus, if the printer is being used in a cold storage warehouse or the like, acceptable performance will be obtained by a simple reversal of the current direction through thermo-module 30 whereby print head 4 will be heated as needed. The heating and cooling effect of thermo-module 30 can be controlled by suitable adjustment of the current flowing in the device.

Figure 4:
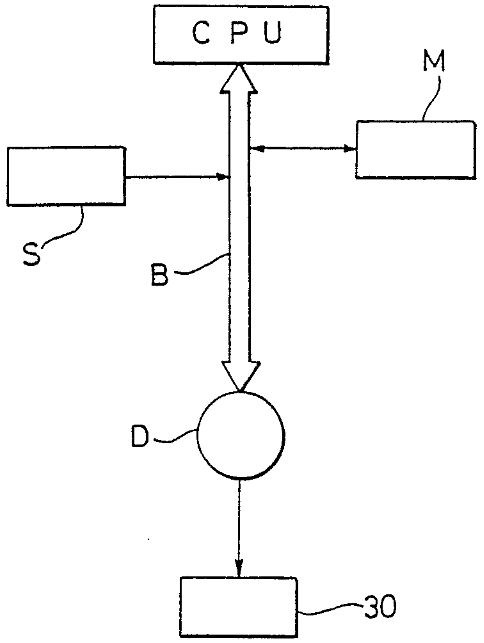
FIG. 4 illustrates a control circuit in accordance with the invention.

A simplified circuit of the type shown in FIG. 4 assures smooth starting operation for a printer constructed in accordance with the present invention. Accordingly, a sensor S is embedded in thermal print head 4 (FIG. 3) and connected via a bus B to a central processing unit (CPU). Also connected to the CPU via bus B are a RAM M in which the optimum printing temperature conditions for thermal print head 4 are stored. Driver circuit D supplies the current for thermo-module 30.

Initially, when the printer is started its thermal print head 4 will not yet have attained its optimum working temperature and the direction of current supplied from driver circuit D will be set so that at least initially thermal print head 4 is being heated. Thereafter, when the sensor S will have detected that the temperature has reached the required level, the current direction in driver circuit D will be changed to cool and maintain thermal print head 4 at the desired temperature level. Through continuous monitoring of sensor S and comparisons of the actual temperature to an internally provided optimum temperature setting reference the temperature can be controlled by adjustment of either the current direction and/or the current magnitude in thermo-module 30.

Actual control of thermo-module 30 can be effected by software or by hard-wired logic circuits employing operational amplifiers and like devices.

The desired temperature regulation of the present invention is practically attained by locating heat pipe or thermo-module 30 of FIGS. 2 and 3 in printing zone 14 wherein thermal print head 4 and platen 5 are disposed. For added effect, both devices can be used in combination as shown in FIGS. 5 and 6.

Figure 5:
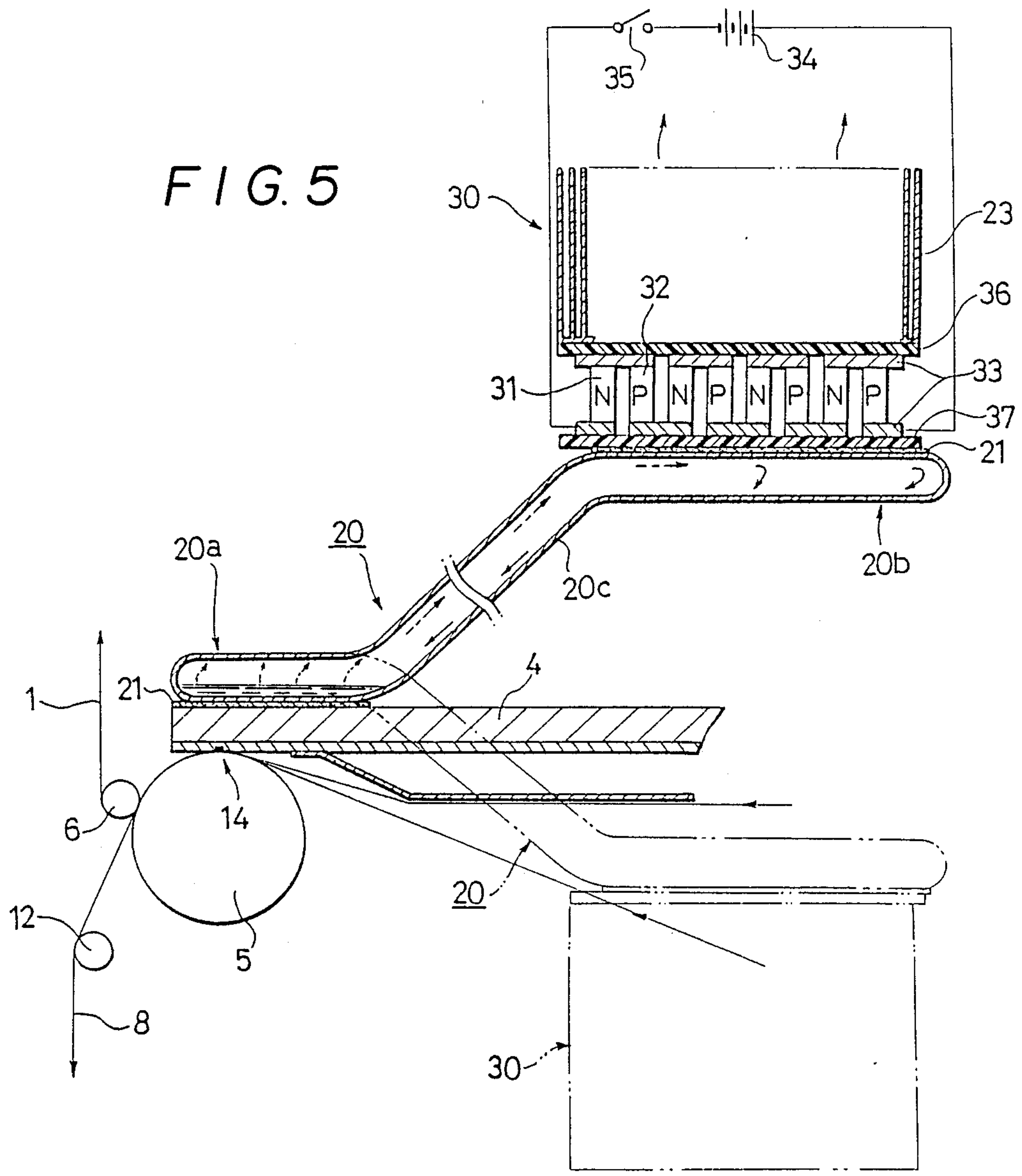
FIG. 5 shows the principal parts of a third embodiment for the invention.
Figure 6:
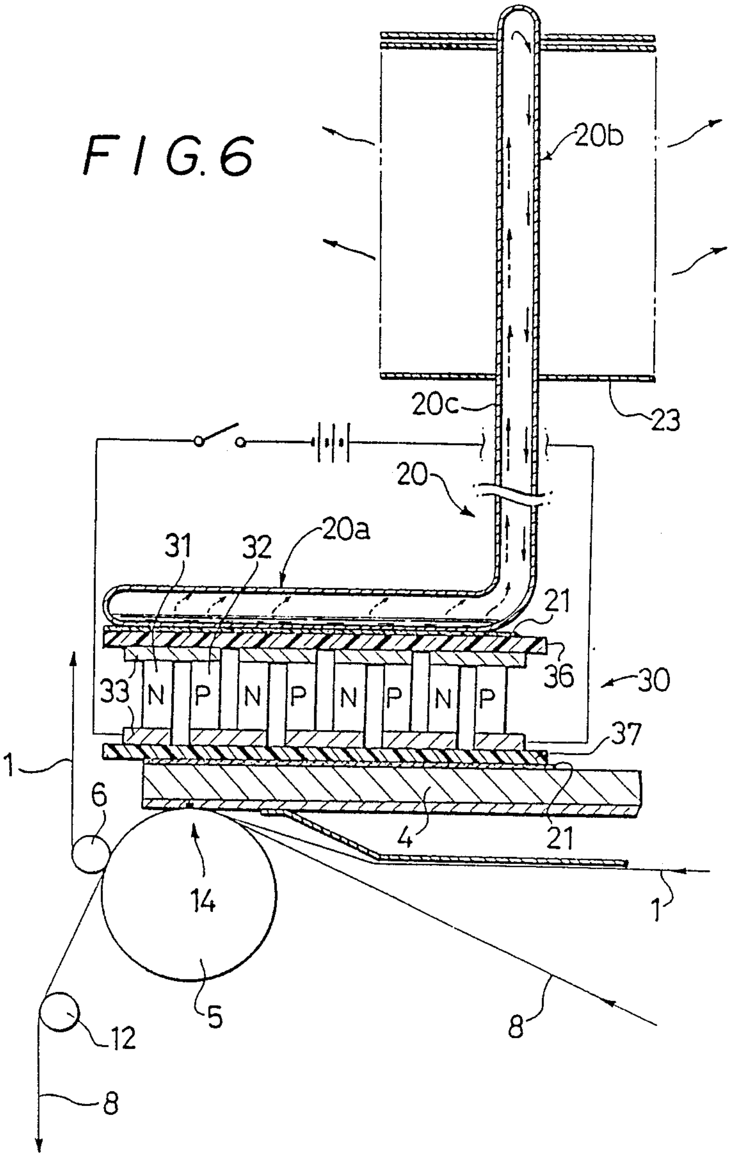
FIG. 6 shows the principal parts of a fourth embodiment.

In FIG. 5, showing a third embodiment, heat absorbing portion 20*a* of heat pipe 20 is disposed on thermal print head 4 as in a previous embodiment. Thermo-module 30 however is coupled to the heat discharge portion of heat pipe 20 which is located away from thermal print head 4.

The arrangement enables more vigorous and rapid cooling of heat discharge portion 20*b* of the heat pipe 20, providing greater cooling action at print head 4. It is comparatively easy to form heat pipe 20 to any desired length or shape. Consequently, the arrangement of FIG. 5 permits the more cumbersome thermo-module 30 to be gainfully used in small or slim printers in which it could not be disposed directly at printing zone 14.

The phantom line arrangement of FIG. 5 according to which the vertical orientation of heat pipe 20 is reversed can be used to heat print head 4 with heat partially supplied from thermo-module 30, with the concurrent current reversal in the thermo-module.

A fourth embodiment appears in FIG. 6. Here thermo-module 30 is in contact with thermal print head 4 and heat pipe 20 is coupled to insulators 37 of thermo-module 30 to enhance the cooling capacity of the thermo-module. Herein, print head 4 is cooled directly by thermo-module 30 to provide comparatively more effective cooling than is provided by the third embodiment.

Figure 7:
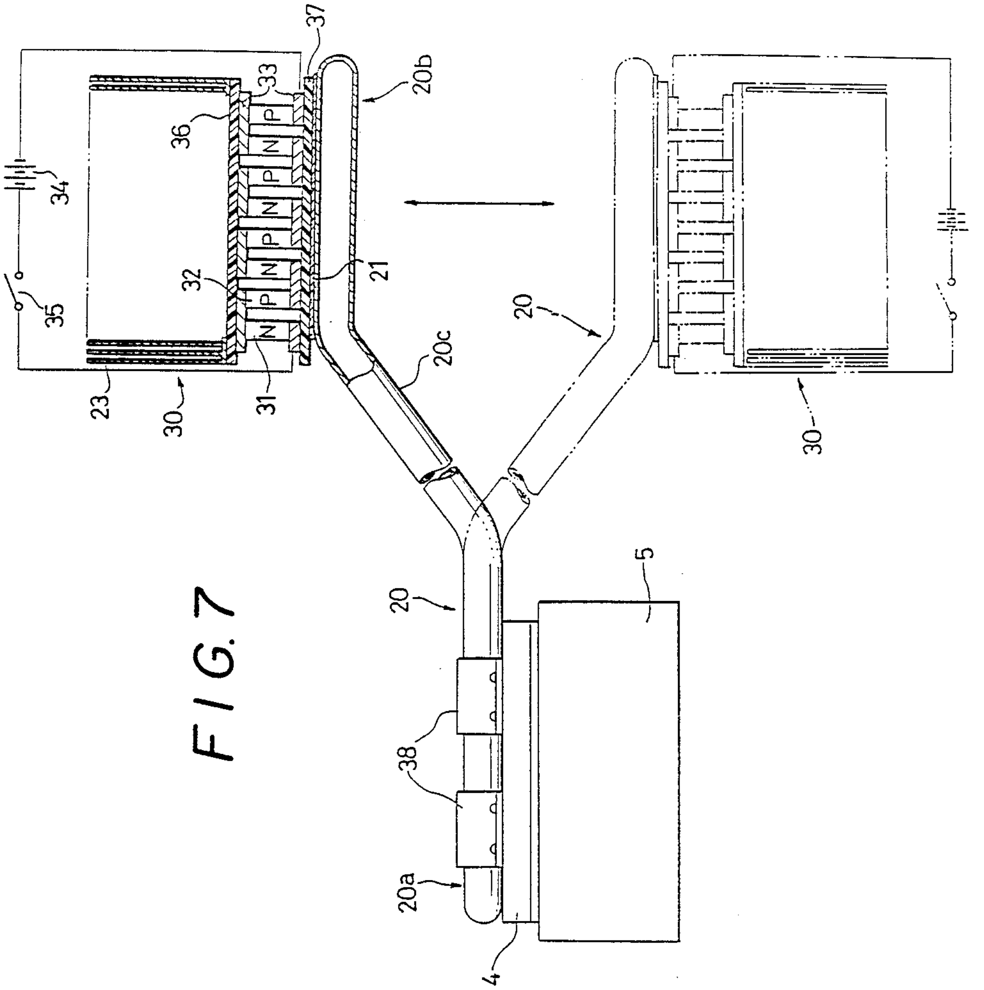
FIG. 7 shows the principal parts of a fifth embodiment.

FIG. 7 is directed to a fifth embodiment which combines heat pipe 20 and thermo-module 30 in a manner which enables ready switching between heating and cooling of the printer as needed. Removable retainers 38 fasten the heat discharge portion 20*b* of the heat pipe 20 so that the vertical orientation relative to the thermal print head 4 is changeable from the solid line drawing to the phantom line drawing. The solid line drawing in FIG. 7 shows a cooling arrangement for thermal print head 4 while the phantom line drawing shows a heating configuration.

Heat pipe 20 of FIGS. 2, 5, 6 and 7 may have various shapes. As needed for specific applications, it may be flat, long and thin, curved, and of any desired size or length.

Figure 8:
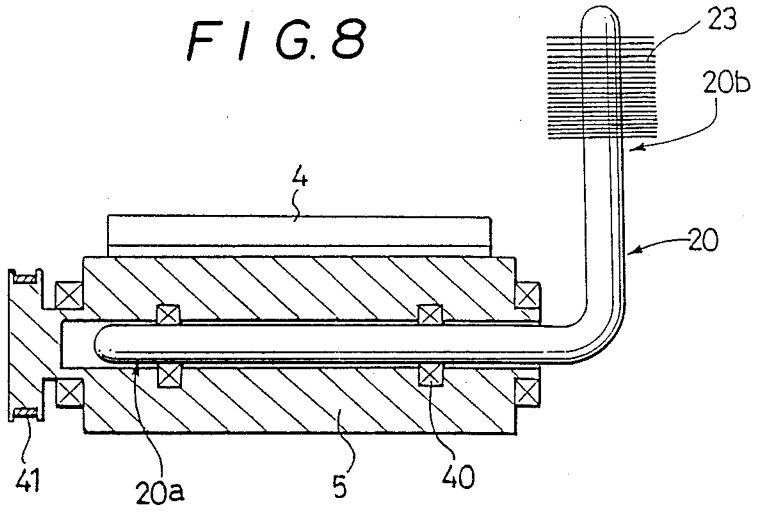
FIG. 8 shows the principal parts of another variant of a heat arrangement.

Furthermore, the mounting of heat pipe 20 is not restricted to the previously depicted embodiments. Good results are attained as long as it is placed anywhere in the vicinity of thermal print head 4 and platen 5 which constitute printing zone 14. In FIG. 8, for example, a bearing 40 is provided inside platen 5 whereby heat pipe 20 is rotatably supported relative to platen 5. If then platen 5 is rotated by timing belt 41, the orientation of heat pipe 20 with respect to the environment remains fixed and heat is efficiently transferred from heat absorbing portion 20*a* to heat discharge portion 20*b*.

Figure 9:
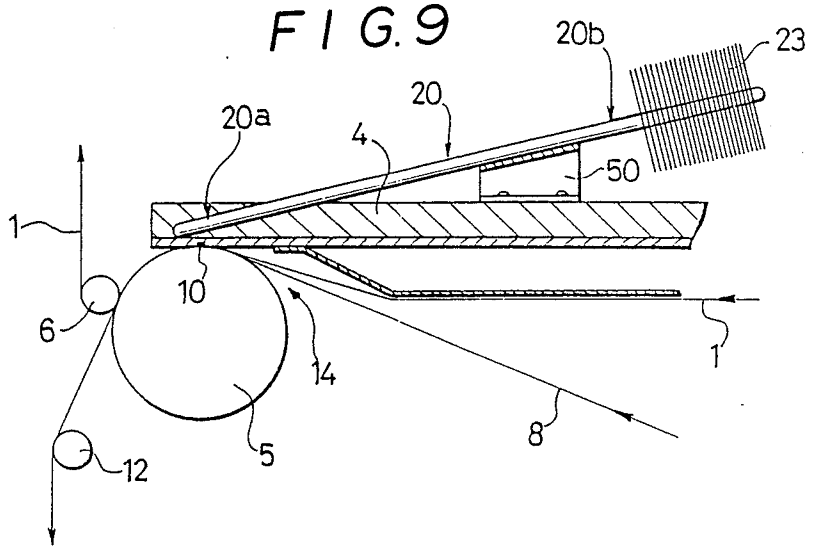
FIG. 9 shows the principal parts of yet another heat pipe in accordance with the present invention.

In FIG. 9, heat absorbing portion 20*a* of heat pipe 20 is integrated into thermal print head 4 and heat discharge portion 20*b* is located away from thermal print head 4. A support bracket 50 for heat pipe 20 is disposed as shown.

The devices of the present invention may be located in the vicinity of a printing zone 14 and not necessarily directly at thermal print head 4 and platen 5.

FIGS. 10 to 13 are directed to further embodiments which deal with a second aspect or feature of the invention which focuses on controlling the overall temperature within a thermal printer.

Figure 10:
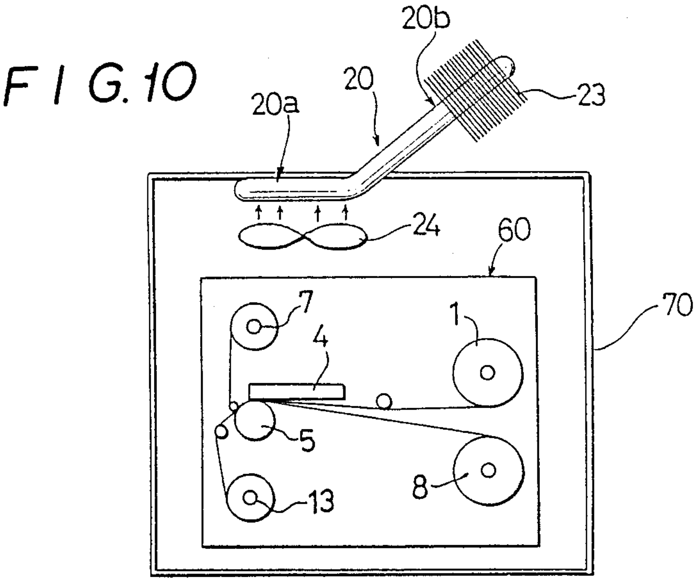
FIGS. 10 to 13 illustrate, respectively, the first to fourth embodiment, based on a second feature of the present invention.

In a first embodiment illustrated in FIG. 10, an entire printer 60 is encased in an openable housing 70 which seals the printer from the ambient atmosphere. Heat absorbing portion 20*a* of heat pipe 20 is disposed inside housing 70 and heat discharge portion 20*b* is located outside the housing. The heat of printer 60 is conducted at high speed from heat absorbing portion 20*a* of heat pipe 20 to heat discharge portion 20*b* to be discharged to the environment. Thereby, the interior of housing 70 is maintained at a constant temperature.

Figure 11:
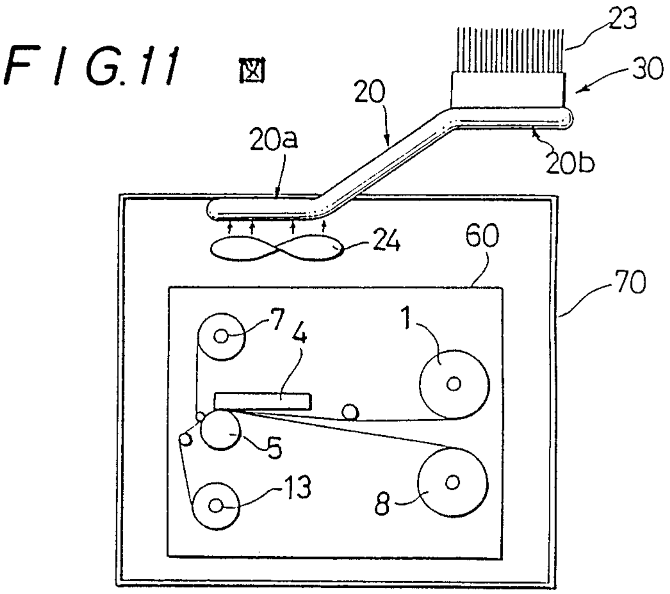

In a second embodiment of FIG. 11, thermo-module 30 is mounted to the distal end of heat pipe 20 in a manner which provides the function of FIG. 5.

Figure 12:
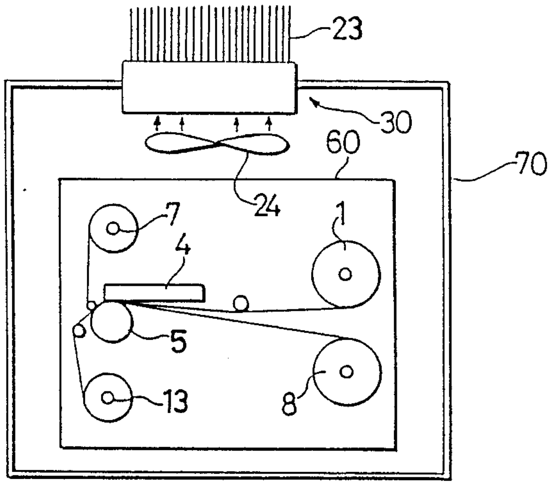

FIG. 12 illustrates a third embodiment wherein the interior of housing 70 is actively cooled by the cooling side of thermo-module 30 which is disposed inside housing 70. The heat discharge end of thermo-module 30 is outside housing 70.

Figure 13:
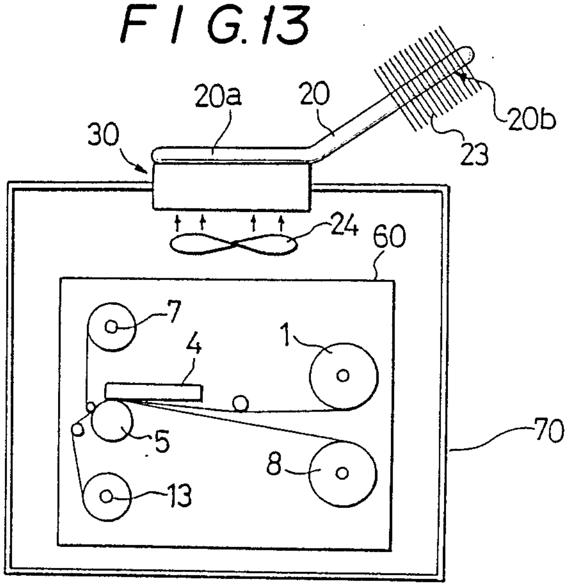

In the embodiment of FIG. 13, heat absorbing portion 20*a* of heat pipe 20 is located on the heat discharge side of the thermo-module 30. The arrangement is similar to the embodiment of FIG. 6 and functions accordingly.

In relation to the third and fourth embodiments of FIGS. 12 and 13, it should be noted that printer 60 may easily be heated by merely changing the current flow direction in thermo-module 30.

The embodiments of FIGS. 10 to 13 provide the additional benefit that since printer 60 is sealed from the environment, dust and dirt are prevented from settling inside printer 60. It is noted generally that the present invention is not solely restricted to printers and that the invention is applicable to any housing provided with heat transfer means such as a heat pipe and a thermo-module as described herein and as needed for temperature regulations.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A thermal printer in combination with a temperature regulating device, comprising:

a thermal printing zone having a thermal print head in the thermal printer;

heat transfer means disposed relative to the thermal printing zone in a manner which is effective for controlling the temperature in the thermal printing zone, the heat transfer means including a heat pipe and a thermoelectric transducer; and control means for controlling the heat transfer means in a manner such that initially, when the thermal printer is turned on, heat is applied to the printing zone and when the temperature at the printing zone has risen to a predetermined level, the heat transfer means is controlled to cool and regulate the temperature at the printing zone to the predetermined level.

2. A thermal printer as in claim 1 wherein the heat pipe includes a heat absorbing portion and a heat discharging portion, the heat absorbing portion being disposed in the printing zone to absorb heat therefrom and the heat discharging portion being located away from the printing zone to carry and discharge heat away from the printing zone.

3. A thermal printer as in claim 2, wherein the heat pipe is located adjacent the thermal print head.

4. A thermal printer as in claim 2 in which the thermal printer contains a platen which is located in the printing zone and in which the heat pipe is located adjacent the platen.

5. A thermal printer as in claim 2, further comprising heat discharging fins mounted to the heat pipe.

6. A thermal printer as in claim 2 in which the heat pipe is integral with the thermal print head.

7. A thermal printer as in claim 1 in which the thermoelectric transducer comprises a first surface in contact with the thermal print head and means for supplying electric current to the thermoelectric transducer to control the transducer to cool the first surface of the thermoelectric transducer.

8. A thermal printer as in claim 7 further comprising means for supplying current to the thermoelectric transducer in a direction which causes the first surface of the thermoelectric transducer to heat the thermal print head.

9. A thermal printer as in claim 7 in which the thermoelectric transducer comprises a second surface and cooling fins mounted at the second surface.

10. A thermal printer as in claim 1, in which the heat pipe is mounted to the thermal print head and the thermoelectric transducer is mounted to the heat pipe in a manner which is effective to absorb heat which the heat pipe carries away from the thermal print head.

11. A thermal printer as in claim 10, further comprising fins mounted to the thermoelectric transducer.

12. A thermal printer as in claim 1, including a thermoelectric transducer in heat conducting contact with the thermal print head and wherein the heat pipe is mounted to the thermoelectric transducer.

13. A thermal printer as in claim 12, further comprising fins attached to the heat pipe.

14. A thermal printer as in claim 1, further comprising means for controlling the current flow direction in thermoelectric transducer in a manner which is effective to provide cooling or heating for the thermal printer.

15. A thermal printer as in claim 1, in which the thermal printer further includes a platen and in which the heat pipe is disposed on the platen and the thermoelectric transducer is mounted to the heat pipe.

16. A thermal printer as in claim 15, further comprising fins attached in a heat conducting manner to the thermoelectric transducer.

17. A thermal printer as in claim 1, further comprising:

a housing for enclosing the thermal printing zone therein; and the heat transfer means disposed partially within an interior of the housing and partially exteriorly of the housing, the heat transfer means being effective for controlling the temperature within the housing.

18. A thermal printer as in claim 17, in which the heat pipe comprises first and second ends and the first end is located inside the housing and the second end is disposed outside the housing.

19. A thermal printer as in claim 18, further comprising fins mounted to the second and of the heat pipe.

20. A thermal printer as in claim 17, in which the thermoelectric transducer comprises a first active surface which is disposed and faces inside the housing and a second surface which is disposed and faces exteriorly of the housing.

21. A thermal printer as in claim 20, further comprising fins mounted in a heat conducting manner to the thermoelectric transducer exteriorly of the housing.

22. A thermal printer as in claim 17, in which the heat pipe and the thermoelectric transducer are coupled to one another.

23. A thermal printer as in claim 22, wherein the heat pipe comprises first and second ends, the first end of the heat pipe being disposed inside the housing, the second end of the heat pipe being disposed outside the housing and the thermoelectric transducer being mounted to the second end of the heat pipe.

24. A thermal printer as in claim 23, further comprising fins attached in a heat conducting manner to the thermoelectric transducer.

25. A thermal printer as defined in claim 22, wherein thermoelectric transducer comprises a first heat conducting surface and a second heat conducting surface and wherein the first heat conducting surface is disposed inside the housing of the thermal printer and the second heat conducting surface is disposed outside the housing, the heat pipe being coupled in a heat conducting manner to the second heat conducting surface of the thermoelectric transducer.

* * * * *